(12) United States Patent
Yagi

(10) Patent No.: US 6,739,243 B2
(45) Date of Patent: May 25, 2004

(54) MOBILE FOOD/DRINK SERVING APPARATUS

(75) Inventor: Yoshinori Yagi, Tokyo (JP)

(73) Assignee: MIK Planning, Inc., Tokyo (JP)

( * ) Notice: Subject to any disclaimer, the term of this patent is extended or adjusted under 35 U.S.C. 154(b) by 0 days.

(21) Appl. No.: 10/446,842

(22) Filed: May 29, 2003

(65) Prior Publication Data

US 2003/0226451 A1 Dec. 11, 2003

(30) Foreign Application Priority Data

Jun. 5, 2002 (JP) ........................... 2002-163696

(51) Int. Cl.[7] .............. A23L 1/00; E04H 3/04
(52) U.S. Cl. ............. 99/352; 99/357; 99/422; 99/517
(58) Field of Search .............. 99/339, 340, 352–355, 99/357, 422–425, 516, 517; 186/27, 38, 45–50; 705/15; 108/20–22; 62/342, 343

(56) References Cited

U.S. PATENT DOCUMENTS

| | | | | | |
|---|---|---|---|---|---|
| 519,630 | A | * | 5/1894 | Hogg .......................... | 108/22 |
| 4,019,605 | A | * | 4/1977 | Kropf .......................... | 186/48 |
| 4,237,796 | A | * | 12/1980 | Gordon et al. ................ | 108/22 |
| 4,349,086 | A | * | 9/1982 | Yamada ....................... | 186/49 |
| 4,637,304 | A | * | 1/1987 | Suzuki ....................... | 99/450.2 |
| 4,977,823 | A | * | 12/1990 | Kuwahara .................... | 99/355 |
| 5,832,813 | A | * | 11/1998 | Shimazu .................... | 99/450.2 |
| 5,870,948 | A | * | 2/1999 | Ono .......................... | 99/450.6 |
| 5,937,764 | A | * | 8/1999 | Olivier ....................... | 108/20 |
| 6,217,311 | B1 | * | 4/2001 | Wade ..................... | 425/436 R |
| 6,244,169 | B1 | * | 6/2001 | Shimazu ................... | 99/450.2 |
| 6,427,806 | B1 | * | 8/2002 | Tanaka ....................... | 186/49 |
| 6,561,317 | B1 | * | 5/2003 | Dudley ....................... | 186/38 |

OTHER PUBLICATIONS

"Steaming dim sum at table", Nikkei Restaurant, Oct., 2000, p. 11.

* cited by examiner

Primary Examiner—Timothy F. Simone
(74) Attorney, Agent, or Firm—Kubovcik & Kubovcik

(57) ABSTRACT

There is provided a mobile food/drink serving apparatus including a body which has electrical equipment, an attaching connector capable of being electrically connected to a power source connector provided on a customer table, and a counter for cooking; and mobility means for moving the apparatus, characterized in that the electrical equipment is supplied with electricity by connecting the attaching connector to the power source connector.

8 Claims, 4 Drawing Sheets

F I G. 2
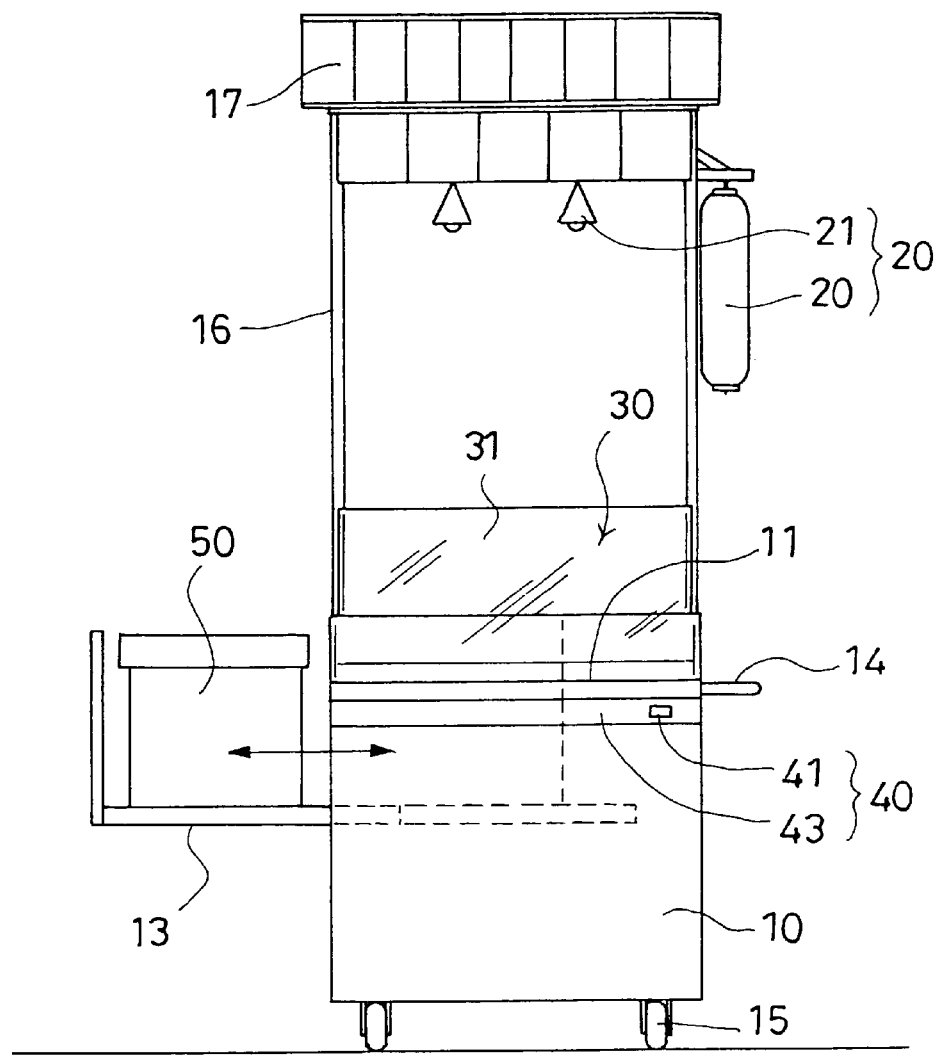

MOBILE FOOD/DRINK SERVING APPARATUS

BACKGROUND OF THE INVENTION

1. Field of the Invention

The present invention relates to a mobile food/drink serving apparatus for simple cooking, such as sushi, before customers and for service of food/drink.

2. Description of the Prior Art

Conventionally, a circulating food/drink serving system such as a kaiten sushi has widely been known. In a kaiten sushi restaurant, plates on which sushi is placed are put on a flat top conveyor, and are circulated before customers sitting at a counter. The customers can take favorite sushi together with a plate passing before them to eat. Nowadays, some restaurants serve various kinds of food/drink other than sushi by circulating them.

However, in such a conventional circulating food/drink serving system, for example of sushi, it is not preferable to circulate the sushi too long since the customers lose their appetite for they do not know when the sushi is made. In addition, there occurs a problem of a waste of material since the sushi circulating for a long time must be disposed. In order to keep moisture, temperature and freshness of the circulating sushi for a long time, however, adequate equipment must be provided. Additionally, the conveyor must be operated even when there is no customer, which wastefully consumes electric power.

On the other hand, for example, in a yum cha restaurant, a wagon or the like is used to serve food/drink to customers sitting at their table. This system using a wagon is to serve ready-made food according to the customers' order. Therefore, the system is unsuitable for sushi etc. because the value of sushi is to eat as soon as it is made.

SUMMARY OF THE INVENTION

In order to solve these problems, the inventor devised an apparatus used to cook and serve food before customers according to their order by moving a kitchen table to a customer table without circulating food/drink as before. The objects of this invention are as follows.

Namely, the first object is to provide a mobile food/drink serving apparatus, by which the food is cooked and dished up near the customer table to be served, and which is useful for reducing the waste of food materials by serving fresh-prepared food according to the customers' order, and for reducing a cost by consuming no unnecessary electric power when separated from the customer table.

The second object is, in addition to the first object described above, to provide a mobile food/drink serving apparatus with less time and labor when supplying electricity to electrical equipment.

The third object is, in addition to the first object or the second described above, to provide a mobile food/drink serving apparatus to arouse the customers' interest and to assist the customers' order of food/drink by supplying electricity to the electrical equipment.

The fourth object is, in addition to the first object, the second or the third described above, to provide a mobile food/drink serving apparatus suitable for food requiring cold storage.

To achieve the first object, the first invention in the present application provides a mobile food/drink serving apparatus comprising a main body (10) and mobility means (e.g. casters (15)) to make the main body mobile. The main body (10) comprises electrical equipment, an attaching connector electrically connectable to a power source connector equipped with a customer table (60) for supplying electricity to the electrical equipment, and a counter (e.g. a cooking counter (12)) for cooking.

Namely, the first invention provides a mobile food/drink serving apparatus for cooking food readily cooked on the counter before customers, and for serving it to the customer, in which electricity for the electrical equipment is supplied from the customer table.

Herein, the "electrical equipment" includes lighting equipment (20), an electrically-driven tool or machine used for cooking, which can be mounted on the main body (10). For example, lighting equipment (20) installed in a decorative portion (17) provided on the main body (10) is a kind of the electrical equipment.

Moreover, the "power source connector" is a connector connectable to a power source, including, for example, a plug socket provided on the customer table (60). The "attaching connector" is a connector connectable to the power source connector, including, for example, a plug that can be inserted into the plug socket.

In the first invention, all of the electrical equipment mounted on the main body (10) may not be power-supplied by connecting the attaching connector and the power source connector; for example, rechargeable refrigerating equipment may be mounted on the main body (10).

According to the first invention, the main body (10) is moved near to the customer table (60) by the mobility means, the electrical equipment is power-supplied from the customer table (60) to turn on the lighting equipment (20), and the food is cooked on the cooking counter (12), by which food can be served. When the apparatus is separated from the customer table (60), the attaching connector is disconnected from the power source connector, and then the main body (10) is moved.

According to the first invention, there can be provided a mobile food/drink serving apparatus, by which the food is cooked and dished up near the customer table to be served, and which is useful for reducing the waste of food materials by serving fresh-prepared food according to the customers' order, and for reducing a cost by consuming no unnecessary electric power when separated from the customer table.

To achieve the above second object, the second invention is, in addition to the characteristic of the first invention, characterized in that the power source connector and the attaching connector are electrically connected by attaching the main body (10) to the customer table (60).

Therefore, the second invention in the present application is so formed that the connection between the power source connector and the attaching connector occurs at the same time of the attachment between the main body (10) and the customer table (60). Namely, by attaching the main body (10) to the customer table (60), the power source connector and the attaching connector are connected to each other and the electricity is supplied to the main body (10).

Concretely, the attaching connector (main body connector (41)) and the power source connector (customer table connector (42)) are installed at a portion at which the main body (10) can attach to the customer table (60).

According to the second invention, the main body 10 is so moved to attach the customer table 60, thereby the electrical equipment being supplied with electricity without inserting a plug.

According to the second invention, in addition to the effect of the first invention, there can be provided a mobile food/drink serving apparatus with less time and labor of supplying the electricity to the electrical equipment.

To achieve the above third object, the third invention is, in addition to the characteristic of the first invention or the second, characterized in that the main body is at least equipped with lighting equipment as the electrical equipment.

The lighting equipment (20) includes a lamp or the like used for decoration in addition to the one for illuminating food materials to be served.

According to the third invention, when the main body (10) is attached to the customer table (60), that is, when service is provided to the customer, lighting is provided, and when the main body (10) is separated from the customer table (60), the lighting is turned off as a necessary consequence.

According to the third invention, in addition to the effect of the first invention or the second, there can be provided a mobile food/drink serving apparatus to arouse the customers' interest and to assist the customers' order of food/drink by supplying electricity to the electrical equipment.

To achieve the above fourth object, the fourth invention is, in addition to the characteristic of the first invention, the second or the third, characterized in that the main body (10) is at least equipped with a refrigerating case (30).

Herein, the "refrigerating case 30" may be any case that can keep food or the like at a fixed low temperature. The case may use ice or a cold reserving material, or may be refrigerating equipment such as a refrigerator as the electrical equipment. In this case as well, electricity may be provided from the power source connector (customer table connector (42)).

The fourth invention is suitable for serving food that is cooked by using food materials requiring cold storage, for example, serving of sushi.

According to the fourth invention, in addition to the effect of the first invention, the second or the third, there can be provided a mobile food/drink serving apparatus suitable for food requiring cold storage.

BRIEF DESCRIPTION OF THE DRAWINGS

FIG. 2 is a front view of a sushi wagon according to an embodiment of the present invention.

DESCRIPTION OF THE PREFERRED EMBODIMENT

A preferred embodiment representing the present invention will be described with reference to the accompanying drawings by taking a sushi wagon as an example.

Sushi Wagon

Figure 1:
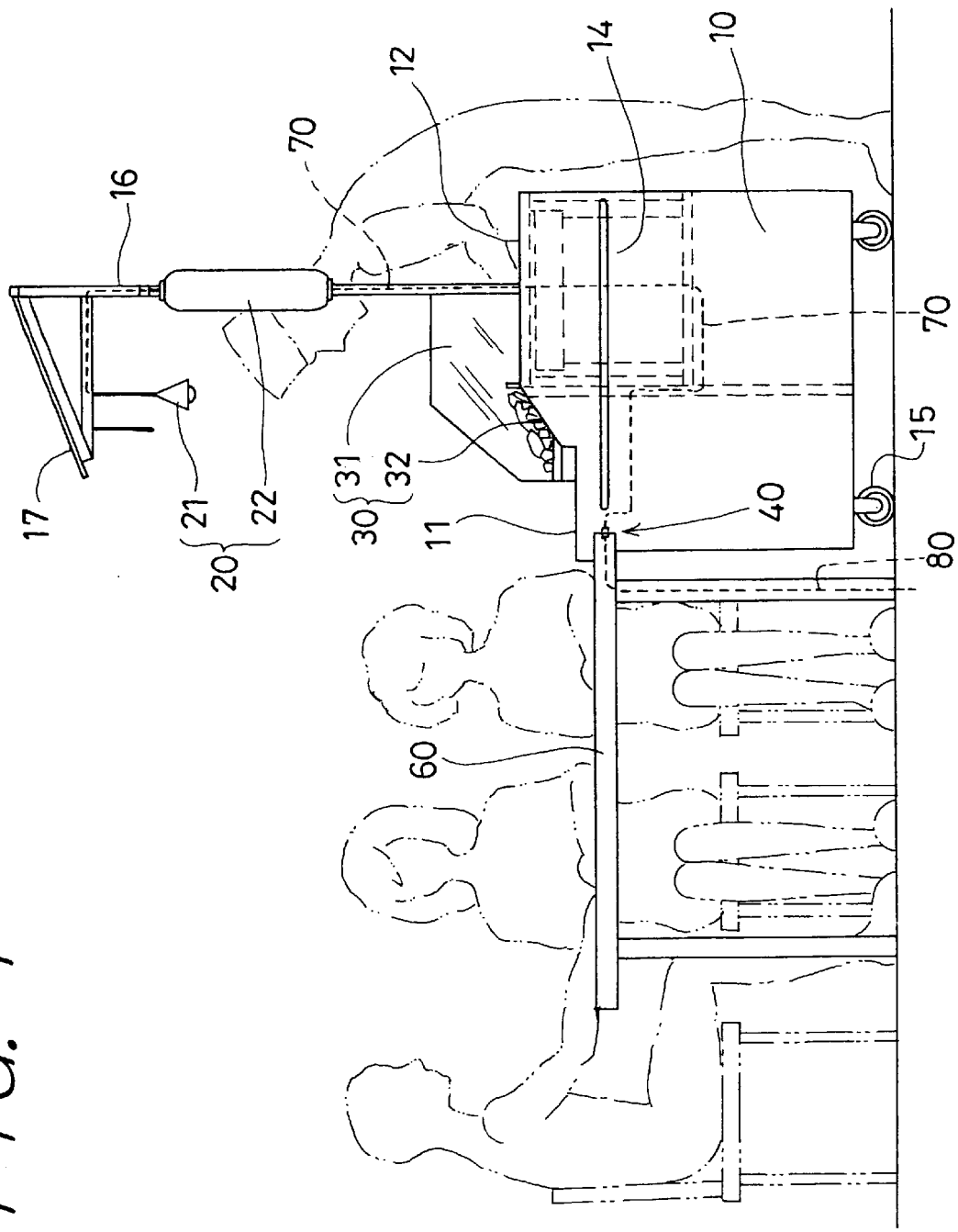
FIG. 1 is a side view of a sushi wagon as a mobile food/drink serving apparatus according to an embodiment of the present invention.

As shown in FIG. 1, a sushi wagon as a mobile food/drink serving apparatus has a housing type main body 10, and is formed so as to be mobile by using a pull pipe 14 provided on a side surface of the main body 10 and casters 15 provided on a bottom surface of the main body 10.

On a top surface of the main body 10, there are provided a serving counter 11 for arranging sushi to be served to customers and a cooking counter 12 for hand-making sushi by a sushi cook. Between the serving counter 11 and the cooking counter 12 is provided a refrigerating case 30.

The serving counter 11 is formed so as to be slightly higher than a customer table 60 so that, when the serving counter 11 is caused to abut against the customer table 60, the customer table 60 gets under the serving counter 11. The reason for this is that the serving counter 11 higher than the customer table 60 makes it easy for the customer to take the arranged sushi.

Under the serving counter 11, a connecting portion 40 is formed to join the main body 10 to the customer table 60. The details of the connecting portion 40 will be described later.

The refrigerating case 30 is a case covered by glass 31, with an opening on the side of the cooking counter (12). In the refrigerating case 30, a display stand 32 is provided to incline down toward the serving counter 11. The display stand 32, which is used to arrange sushi materials, is so formed that the customer can easily see the sushi materials, and pieces of ice are laid under the sushi materials to keep the freshness of the displayed sushi materials.

The refrigerating case 30 should be provided with a door in the opening thereof to prevent cold air therein from escaping. Moreover, cold reserving material may be used in place of ice. Further, the refrigerating case 30 may be so formed that the interior of the refrigerating case 30 is refrigerated by a refrigerator as electrical equipment.

Above the main body 10 is formed a frame 16 with legs rising from both ends of the cooking counter 12. A top portion of the frame 16 has a roof shape, and is provided with a decorative portion 17 with a short curtain. Moreover, the frame 16 is provided with lighting equipment 20. As the lighting equipment 20, a spotlight 21 for illuminating the sushi materials in the refrigerating case 30 and a paper lantern 22 for fulfilling function as a part of decoration are provided.

Figure 3:
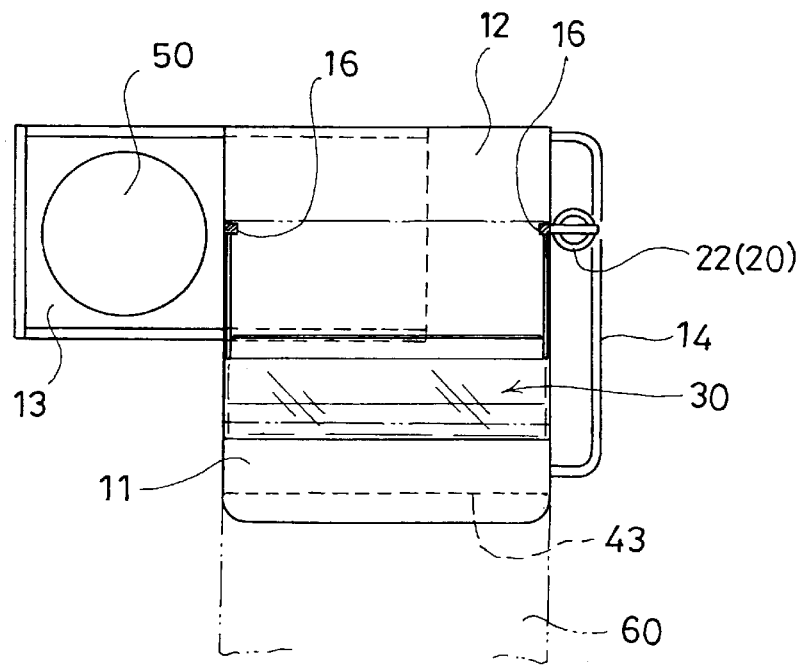
FIG. 3 is a plan view of a sushi wagon according to an embodiment of the present invention.

Further, as shown in FIG. 2 or FIG. 3, a slide table 13 is housed in the main body 10. The slide table 13 is so formed that a sushi-making machine 50 with a rice-tub shape may be placed thereon. The slide table 13 with the sushi-making machine 50 being placed thereon can be stored in the main body 10, and when the slide table 13 is pulled out, the sushi-making machine 50 is exposed out of the main body 10.

The sushi-making machine 50 is a machine in which a rice portion of hand-made sushi is automatically manufactured by putting vinegared rice therein and by turning on the switch. An employee serves sushi by putting an ordered sushi material on the rice portion manufactured by the sushi-making machine 50 and by performing hand-making. The configuration may be such that an ordinary rice tub is placed in place of the sushi-making machine 50, and that a sushi cook makes sushi by his hands.

The above-described lighting equipment 20 and sushi-making machine 50 are connected, via a cord 70, to the connecting portion 40 provided on a front side of the main body 10. Next, the connecting portion 40 will be described in detail.

The connecting portion 40 is a joint portion between the main body 10 and the customer table 60, in which a main body connector 41 provided on the main body 10 of the sushi wagon and a customer table connector 42 provided at the end of the customer table 60 are formed so as to be capable of being electrically connected to each other.

Figure 4:
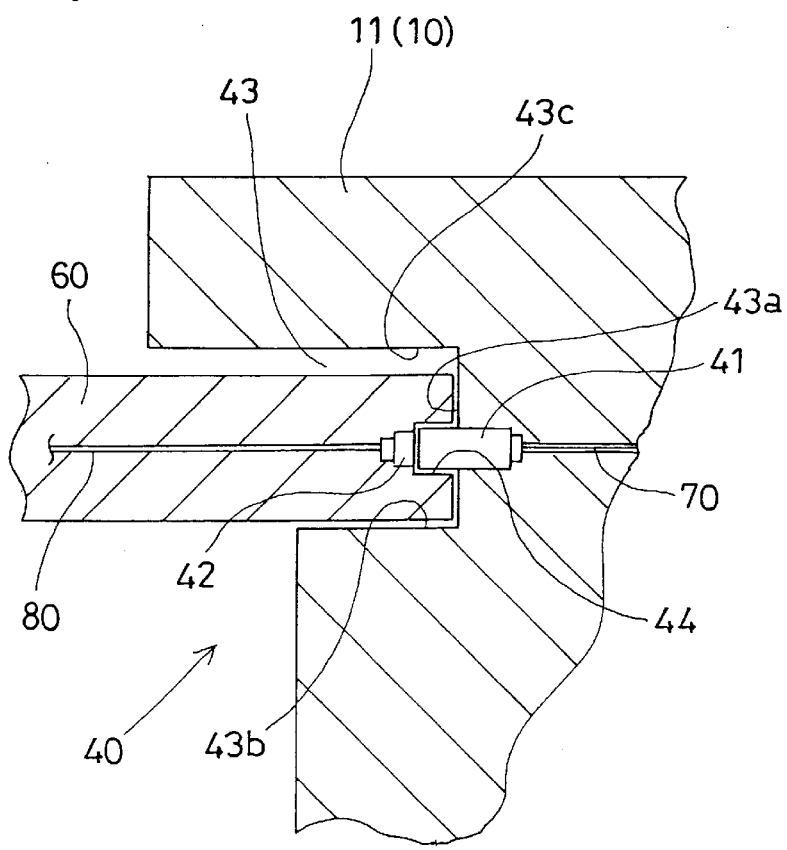
FIG. 4 is a sectional view showing a connecting portion between a customer table and a sushi wagon according to an embodiment of the present invention.

Specifically, as shown in FIG. 4, under the serving counter 11 of the main body 10, a recess 43 opening toward the front side is formed, and the main body connector 41 is projected from a vertical face 43*a* of the recess 43. The recess 43 is so formed that an end of the customer table 60 gets thereinto. Specifically, the recess 43 is so formed that a back surface of the customer table 60 is higher than a bottom face 43*b* of the recess 43 and that the top surface of the customer table 60 is lower than a top face 43*c* of the recess 43. Moreover, the main body connector 41 is connected to the electrical equipment such as the lighting equipment 20 via the cord 70.

On the other hand, on an edge face of the customer table 60, the customer table connector 42 is provided. The customer table connector 42 is exposed on the vertical face of a recess 44 into which the main body connector 41 can be inserted, and is connected to a power source via a cord 80. In a state in which the end of the customer table 60 gets into the recess 43 in the main body 10, an end face of the main body connector 41 is in contact with an end face of the customer table connector 42, whereby the electrical equipment mounted on the sushi wagon is electrically connected to the power source.

When the main body connector 41 is connected to the customer table connector 42, considering that the height of the customer table 60 and the height of the main body 10 have an error, it is desirable that the opening of the recess 44 is so formed as to have some play with respect to the main body connector 41. Moreover, not shown in the figure, the main body 10 may be adapted to position itself by providing a guide pin in the main body 10 and inserting it into a hole formed in the edge face of the customer table 60.

Figure 5:
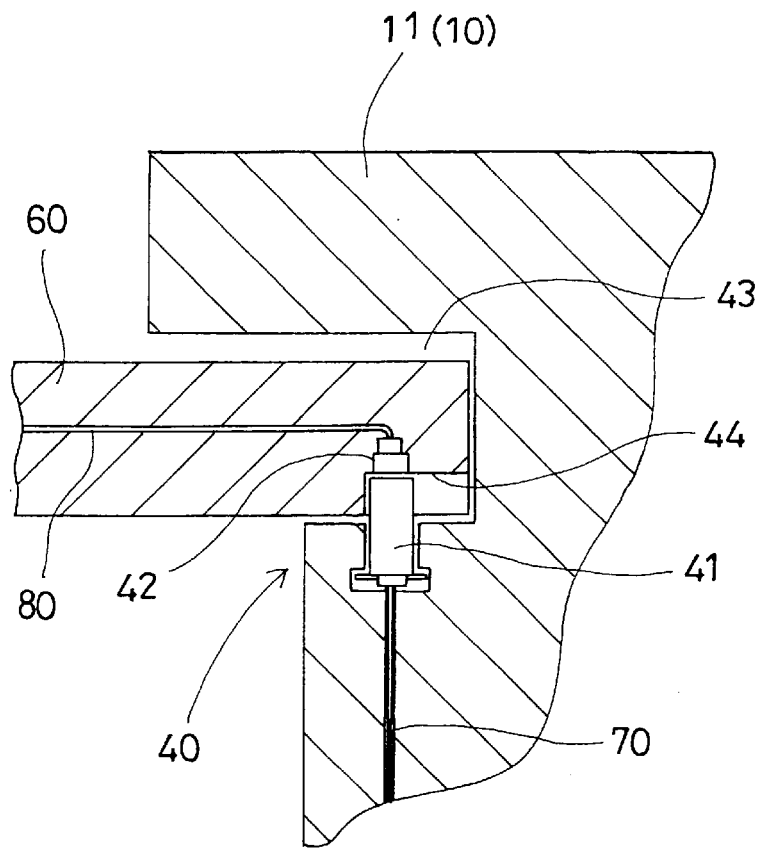
FIG. 5 is a sectional view showing another example of a connecting portion between a customer table and a sushi wagon according to an embodiment of the present invention.

If the customer table connector 42 is provided on the edge face of the customer table 60 as described above, water spilled on the table may get to a connector terminal, which creates danger. Therefore, as shown in FIG. 5, the recess 44 may be provided on the bottom side of the guest table 60 so that the customer table connector 42 is directed downward. In this case, the main body connector 41 is projected upward from the bottom face 43*b* of the recess 43. Further, the main body connector 41 is so formed as to be slightly mobile vertically, and a magnet is installed on end faces of the customer table connector 42 and the main body connector 41, by which some difference in height can be absorbed.

Figure 6:
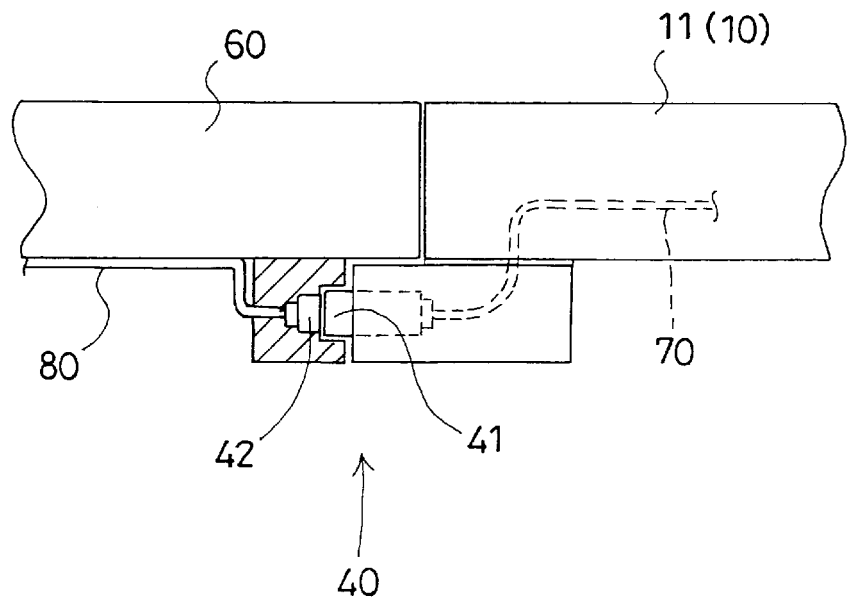
FIG. 6 is a sectional view showing a connecting portion between a customer table and a sushi wagon according to another embodiment of the present invention.

Although the customer table 60 is so formed as to get under the serving counter 11 in this embodiment, the customer table 60 and the serving counter 11 may be so formed as to be flush with each other as shown in FIG. 6.

The serving of sushi using the sushi wagon having the above-described construction will be described below.

First, the sushi wagon is moved to the customer table 60 at which customers sit. At this time, the sushi wagon is easy to move by grasping the pull pipe 14. The sushi wagon can be moved freely because the casters 15 are provided on the bottom surface of the main body 10.

Next, the serving counter 11 is caused to abut against one side of the customer table 60 provided with the customer table connector 42. Thereby, the customer table 60 is fitted into the recess 43 under the serving counter 11, and the main body connector 41 is electrically connected to the customer table connector 42. At this time, the electrical equipment mounted on the main body 10 is energized, by which the lighting equipment 20 is lighted, and the sushi-making machine 50 is made operable. By lighting the spotlight 21 for lighting the sushi material, the customers can easily see the material in the refrigerating case 30. Moreover, by lighting the paper lantern 22, the atmosphere of sushi restaurant can be enjoyed.

Then, the employee makes sushi at the cooking counter 12 according to the customers' order and serves it to them. Specifically, the employee puts a sushi material stored in the refrigerating case 30 on a rice portion made by the sushi-making machine 50 and makes hand-made sushi, or makes layer-roll. The sushi is placed on the serving counter 11, and the customer takes it to eat.

After the customers have finished eating, the sushi wagon can be moved to another table. At the time of moving, the slide table 13 is housed in the main body 10. When the sushi wagon is separated from the customer table 60, the main body connector 41 is disconnected from the customer table connector 42, so that the lighting equipment 20 and the like are turned off.

If sushi is served by using the mobile food/drink serving apparatus according to the present invention such as a sushi wagon, sushi having just been made before customers can be served according to the customers' order. Therefore, unlike kaiten sushi, waste of food materials can be avoided, and wasteful power consumption at the non-serving time can be eliminated, which contributes to cost reduction. Further, sushi can be served in an atmosphere different from that of kaiten sushi restaurant and ordinary sushi restaurant, so that customer's interest can be evoked.

Industrial Applicability

The present invention can be applied to not only a sushi wagon but also a mobile food/drink serving apparatus for serving food that can be cooked readily before customers. For example, if a heat reserving case is provided in place of the refrigerating case, warm food can be served.

What is claimed is:

1. A mobile food/drink serving apparatus comprising:
   i) a main body comprising:
      a) electrical equipment;
      b) an attaching connector electrically connectable to a power source connector equipped with a customer table for supplying electricity to the electrical equipment; and
      c) a counter for cooking; and
   ii) mobility means to make the main body mobile.

2. The mobile food/drink serving apparatus according to claim 1, wherein the power source connector and the attaching connector are electrically connected by attaching the main body to the customer table.

3. The mobile food/drink serving apparatus according to claim 1, wherein the main body is at least equipped with lighting equipment as the electrical equipment.

4. The mobile food/drink serving apparatus according to claim 2, wherein the main body is at least equipped with lighting equipment as the electrical equipment.

5. The mobile food/drink serving apparatus according to claim 1, wherein the main body is at least equipped with a refrigerating case.

6. The mobile food/drink serving apparatus according to claim 2, wherein the main body is at least equipped with a refrigerating case.

7. The mobile food/drink serving apparatus according to claim 3, wherein the main body is at least equipped with a refrigerating case.

8. The mobile food/drink serving apparatus according to claim 4, wherein the main body is at least equipped with a refrigerating case.

* * * * *